3,100,551
POWER STEERING APPARATUS
James R. Van Dien, South Bend, Ind., assignor to The Bendix Corporation, South Bend, Ind., a corporation of Delaware
Filed Dec. 19, 1960, Ser. No. 76,966
5 Claims. (Cl. 180—79.2)

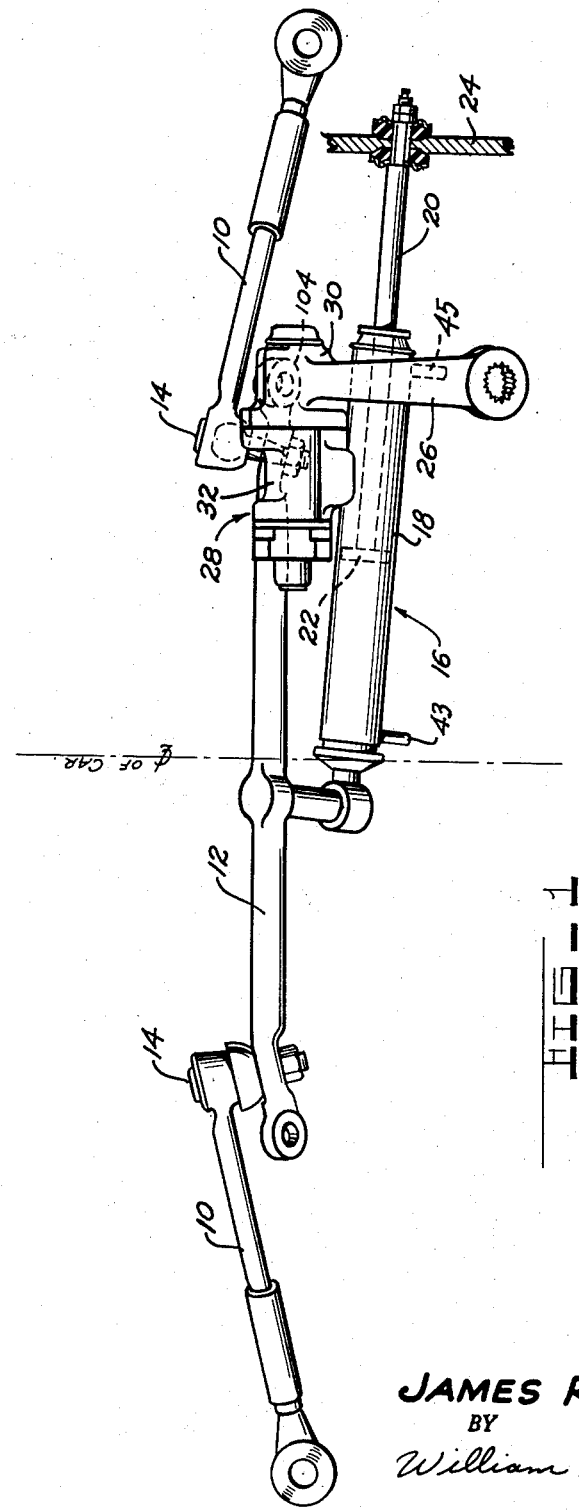

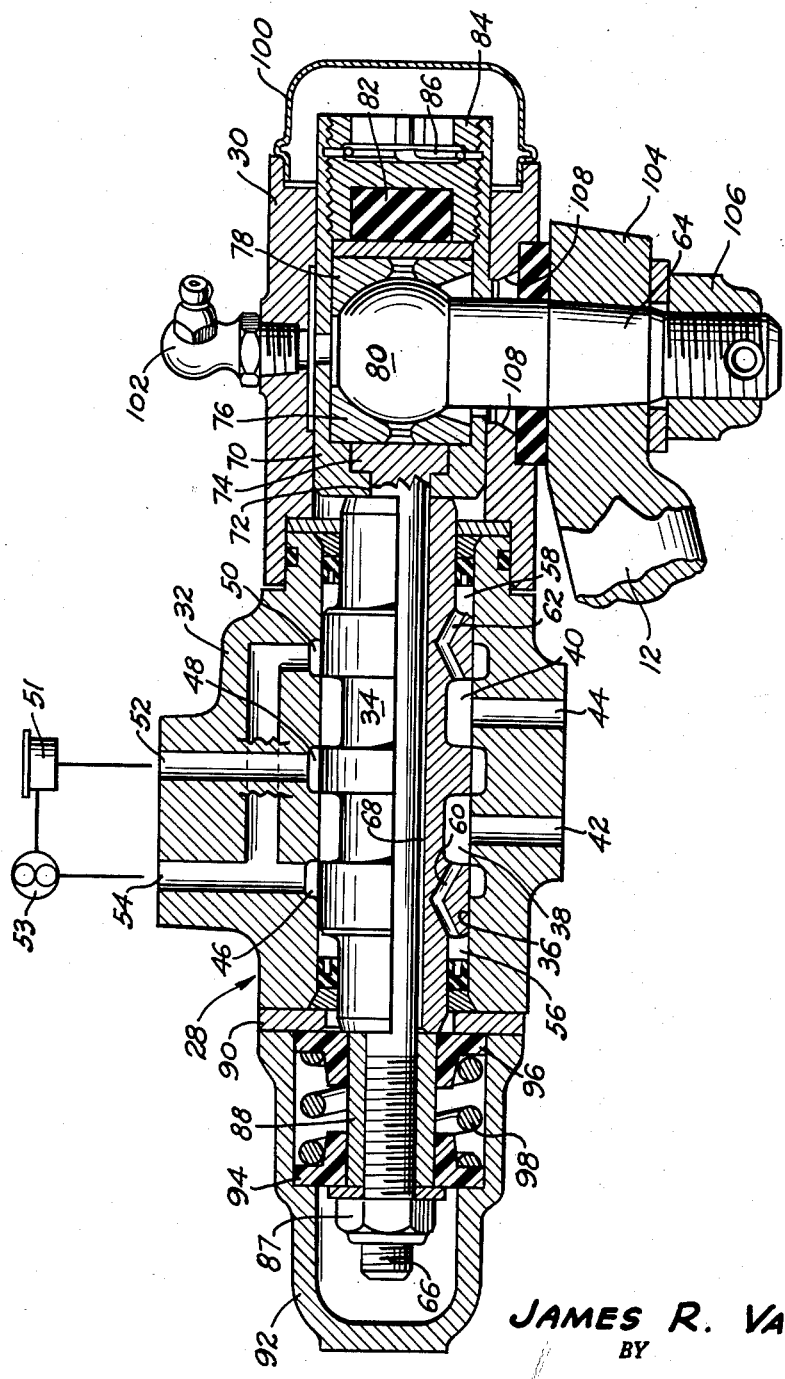

This invention relates to power steering, and more specifically to an improved hydraulic power steering apparatus for a ground vehicle.

An object of this invention is to provide a power steering installation which will provide maximum flexibility for various steering geometries.

Another object of this invention is to provide a power steering apparatus that lends itself to installation in the field.

More specifically, it is an object of this invention to provide a power steering apparatus that can utilize the same cross link and/or drag link, tie rods, etc. that are used on non-power steering linkages.

A further object of this invention is to provide a power steering arrangement wherein the tie rods may be mounted either inboard or outboard of the pitman arm.

An important object of this invention is to provide a power steering installation wherein the valve is carried by the pitman arm and is actuated by a ball stud connected to the cross link or drag link.

Another object of this invention is to provide a power steering installation wherein a portion of the valve housing is formed as part of the pitman arm.

A further object of this invention is to provide a power steering installation of the type described wherein a ball stud operatively connects the spool of a spool type valve with the cross link or drag link of the steering linkage and stop means are provided on that portion of the valve housing which is formed as part of the pitman arm to provide positive contact with the ball stud and consequent manual steering in the event of power failure.

A still further object of this invention is to provide a power steering installation wherein the size of the valve package may be reduced in comparison with other valves utilized in comparable power steering installations.

Another object of this invention is to provide a power steering apparatus that will cost less than those previously offered to the public without sacrificing operating efficiencies.

The above and other objects and features of the invention will become apparent from the following description of the apparatus taken in connection with the accompanying drawings which form a part of this specification and in which:

FIGURE 1 is a plan view of a vehicle steering linkage illustrating in section and elevation my novel power steering installation; and FIGURE 2 is a sectional view of a power steering valve shown in connection with a portion of the steering linkage and in association with a hydraulic system therefor.

Referring to FIGURES 1 and 2, it will be noted that numeral 10 designates two tie rods which are suitably connected to the steered wheels (not shown) of a vehicle and that numeral 12 designates a cross link extending between and suitably connected to the inner ends 14 of the tie rods 10. Power is applied to the steering linkage through means of a power cylinder 16 wherein the cylinder 18 is suitably connected to the cross link 12 and the piston rod 20 of piston 22 is suitably connected to a fixed part 24 of the vehicle. A pitman arm 26 is suitably connected to a steering shaft (not shown) and carries a control valve 28. The valve includes a two part housing, the first part 30 being a tubular sleeve which is integrally formed on the end of the pitman arm 26 and the second part 32 being the portion of the valve housing which contains the requisite hydraulic porting. A spool member 34 is located within a bore 36 of valve housing 32 and is movable in opposite directions from a normally neutral or center position for controlling flow in the hydraulic system. The spool member is formed with two annular channels 38 and 40 which communicate with cylinder ports 42 and 44. One of the cylinder ports communicates with one side of piston 22 via conduit 43 while the other cylinder port communicates with the other side of piston 22 via conduit 45. The bore 36 of the valve housing is provided with annular channels 46, 48, and 50. Annular channel 48 is in communication with the reservoir 51 via return port 52, while annular passages 46 and 50 communicate with the pump 53 via inlet port 54. The control valve shown is an open center type valve which in neutral position allows free flow of hydraulic fluid between inlet port 54 and return port 52 via the annular channels which are arranged in overlapping relationship. Hydraulic reaction is provided by communicating hydraulic reaction chambers 56 and 58 with cylinder ports 42 and 44 via passages 60 and 62.

The valve spool 34 is operatively connected to a ball stud 64 for sliding movement in the bore. The connection to the stud is an assembly of parts comprising a bolt 66, extending through a central passage 68 of the valve spool, a bushing 70 having an opening 72 therein which passes the small diameter of the bolt but not the enlarged end 74, members 76 and 78 providing sockets for the spherical end 80 of ball stud 64, an anti-rattling resilient rubber member 82, an adjusting plug 84 threaded into bushing 70, and a lock wire 86. Located on the other end of the spool is a self-locking nut 87 which is threaded onto the end of bolt 66, a spacer sleeve 88 located between the nut and the spool, a stop ring 90 which is fixed between the valve housing 32 and endcap 92 so that the spool may move with respect thereto, nylon retaining rings 94 and 96, the first of which abuts stop ring 90 and the second of which abuts a shoulder formed on endcap 92, and a preloaded centering spring 98 confined between the retaining rings. An endcap 100 protects the actuator assembly, while a grease fitting 102 is shown for periodic lubrication of the assembly. The ball stud 64 is suitably connected to the end 104 of the cross link 12 through means such as nut 106.

From the previous description it will be understood that the valve housing 30, 32 is connected to the pitman arm 26, while the valve spool member 34 is connected to the cross link 12. Thus, upon clockwise rotation of the steering wheel the pitman arm will cause the valve housing to move in one direction relative to the spool member thereby causing pressurization of one side of piston 22 in a conventional manner, whereas counterclockwise rotation of the steering wheel will cause the pitman arm to move the valve housing in the opposite direction relative to the spool member thereby causing pressurization of the other side of piston 22. Such pressurization of the piston 22 will cause concomitant movement of the cross link 12, tie rods 10, and associated steered wheels. In the event of power failure manual steering is provided when one of the stops 108 formed on the pitman arm portion of the valve housing contacts the ball stud 64 after the valve housing has been shifted to the limit of its movement without having achieved any power response. Upon such contact between the stop 108 and the ball stud, movement of the cross link, tie rods, and steered wheels will be caused through manual forces.

The several practical advantages which flow from my power steering installation are believed to be obvious from the above, and other advantages may suggest themselves to those who are familiar with the art to which this invention relates.

Furthermore, although my invention has been described in connection with a specific embodiment, it will be obvious to those skilled in the art that various changes may be made in the form, structure, and arrangement of parts without departing from the spirit of the invention. For example, my invention could be adapted to a conventional steering linkage arrangement wherein the cross link is replaced by a drag link which is operatively connected to the tie rods but extends fore and aft of the vehicle. Accordingly, I do not desire to be limited to the specific embodiment disclosed herein primarily for purposes of illustration, but instead desire protection falling within the scope of the appended claims.

Having thus described the various features of the invention, what I claim as new and desire to secure by Letters Patent is:

1. In a power steering apparatus for a vehicle provided with steering means, steered means, and two tie rods having spaced inner ends and having outer ends respectively connected to said steered means, the combination of: a cross link extending between and pivotally connected to said inner ends of said tie rods, a fluid pressure source, motor means operable by fluid pressure transmitted from said source and operatively connected to said steered means and a fixed part of said vehicle for moving said steered means, means for transmitting said fluid pressure from said source to said motor means, a pitman arm operatively connected to said steering means, said pitman arm having a substantially tubular member integrally formed on the end thereof, valve means carried by said pitman arm and located in said means for transmitting fluid pressure from said source to said motor means, said valve means including a two part housing and a spool valve element movable relative to each other, said tubular member having an opening therein and serving as one part of said two part housing, a ball stud operatively connected to said cross link and to said spool valve element for causing relative movement between said spool valve element and said housing in response to movement of said pitman arm and tubular member, said ball stud extending through the opening in said tubular member and being arranged so that the walls surrounding said opening will contact said ball stud and cause movement of said ball stud, cross link and steered means when the tubular member has been shifted to the limit of its movement.

2. In a power steering apparatus for a vehicle provided with steering means, steered means, and two tie rods having spaced inner ends and having outer ends respectively connected to said steered means, the combination of: a link operatively connected to said tie rods, a fluid pressure source, motor means operable by fluid pressure transmitted from said source and operatively connected to said steered means and a fixed part of said vehicle for moving said steered means, means for transmitting said fluid pressure from said source to said motor means, a pitman arm operatively connected to said steering means, said pitman arm having a substantially tubular member integrally formed on the end thereof, valve means carried by said pitman arm and located in said means for transmitting fluid pressure from said source to said motor means, said valve means including a two part housing and a spool valve element movable relative to each other, said tubular member having an opening therein and serving as one part of said two part housing, a ball stud operatively connected to said link and to said spool valve element for causing relative movement between said spool valve element and said housing in response to movement of said pitman arm and tubular member, said ball stud extending through the opening in said tubular member and being arranged so that the walls surrounding said opening will contact said ball stud and cause movement of said ball stud, link and steered means when the tubular member has been shifted to the limit of its movement.

3. In a power steering apparatus for a vehicle provided with steering means, steered means, and two tie rods having spaced inner ends and having outer ends respectively connected to said steered means, the combination of a link operatively connected to said tie rods, a fluid pressure source, motor means operable by fluid pressure transmitted from said source and operatively connected to said steered means and a fixed part of said vehicle for moving said steered means, means for transmitting said fluid pressure from said source to said motor means, a pitman arm operatively connected to said steered means, said pitman arm having a substantially tubular member integrally formed on the end thereof, valve means carried by said pitman arm and located in said means for transmitting fluid pressure from said source to said motor means, said valve means including a two part housing and a valve element movable relative to each other, said tubular member serving as one part of said two part housing, and means connecting said link to said valve element for causing relative movement between said valve element and said housing in response to movement of said pitman arm and tubular member.

4. In a power steering apparatus for a vehicle provided with steering means, steered means, and two tie rods having spaced inner ends and having outer ends respectively connected to said steered means, the combination of: a cross link extending between and pivotally connected to said inner ends of said tie rods, a hydraulic pump, hydraulic motor means operable by fluid under pressure delivered by said pump for moving said cross link longitudinally thereof in either direction to steer the steered means through said tie rods, said hydraulic motor means including cylinder and piston members extending in the direction of said cross link, one of said members being pivotally anchored relative to the frame of said vehicle and the other of said members being operatively connected to said cross link for moving said cross link longitudinally thereof in one direction or the other depending on the fluid pressures existing in said cylinder member on opposite sides of said piston member, means of fluid communication between said hydraulic pump and said hydraulic motor means for admitting fluid into and discharging fluid from said cylinder member on the opposite sides of said piston member, a pitman arm operatively connected to said steering means, valve means carried by said pitman arm and located in said means of fluid communication for controlling the admission of fluid into and the discharge of fluid from the opposite sides of the piston member of said hydraulic motor means, said valve means including a valve housing having a portion thereof formed as part of the pitman arm and a valve element disposed in said valve housing and movable relative thereto, and means connecting said cross link to said valve element for causing actuation of said valve means in response to movement of said pitman arm.

5. A power steering apparatus as defined in claim 4 wherein a ball stud operatively connects said valve element with said cross link, and stop means are provided on that portion of the valve housing which is formed as part of the pitman arm to provide positive contact with said ball stud for moving said ball stud, cross link and steered means when the valve housing has been shifted to the limit of its movement.

References Cited in the file of this patent

UNITED STATES PATENTS 2,808,120    Hunter  ---------------- Oct. 1, 1957